US011725504B2

(12) United States Patent
Alerigi et al.

(10) Patent No.: US 11,725,504 B2
(45) Date of Patent: Aug. 15, 2023

(54) CONTACTLESS REAL-TIME 3D MAPPING OF SURFACE EQUIPMENT (71) Applicant: Saudi Arabian Oil Company, Dhahran (SA)

(72) Inventors: Damian Pablo San Roman Alerigi, Al-Khobar (SA); Sameeh Issa Batarseh, Dhahran (SA); Mishaal Elaiwy, Dhahran (SA); Adrian Cesar Cavazos Sepulveda, Nuevo Leon (MX); Mutlaq S. Alotaibi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 37 days.

(21) Appl. No.: 17/328,159

(22) Filed: May 24, 2021

(65) Prior Publication Data

US 2022/0372868 A1     Nov. 24, 2022

(51) Int. Cl.
*E21B 47/135*     (2012.01)
*G01S 17/894*     (2020.01)
(Continued)

(52) U.S. Cl.
CPC .......... *E21B 47/135* (2020.05); *E21B 47/002* (2020.05); *G01B 11/002* (2013.01); *G01S 17/894* (2020.01)

(58) Field of Classification Search
CPC .. E21B 47/135; E21B 47/002; E21B 47/0025; G01B 11/002; G01S 17/894
See application file for complete search history.

(56) References Cited

U.S. PATENT DOCUMENTS 2,757,738 A   9/1948   Ritchey
2,795,279 A   6/1957   Erich
(Continued)

FOREIGN PATENT DOCUMENTS

CA    2669721      7/2011
CN    101079591    11/2007
(Continued)

OTHER PUBLICATIONS

U.S. Appl. No. 17/064,459, filed Oct. 6, 2020, Alelaiwy et al.
(Continued)

*Primary Examiner* — Kristyn A Hall
(74) *Attorney, Agent, or Firm* — Fish & Richardson P.C.

(57) ABSTRACT

Systems and methods include a computer-implemented method for providing a photonic sensing system to perform an automated method to characterize displacement of equipment surfaces and monitor changes in real-time. A three-dimensional (3D) point cloud of one or more objects is generated by an analysis and presentation system using light information collected through structured light illumination by an array of structured-light sensors (SLSes) directed toward the one or more objects. Generating the point cloud includes defining points of the 3D point cloud that are relative to reference points on the one or more objects. Real-time contactless 3D surface measurements of the one or more objects are performed using the 3D point cloud. Changes in one or more parts of the one or more objects are determined by the an analysis and presentation system by analyzing the real-time contactless 3D surface measurements.

17 Claims, 7 Drawing Sheets

(51) Int. Cl.
  *E21B 47/002* (2012.01)
  *G01B 11/00* (2006.01)

(56) References Cited

U.S. PATENT DOCUMENTS

| | | |
|---|---|---|
| 2,799,641 A | 7/1957 | Gordon |
| 3,016,244 A | 1/1962 | Friedrich et al. |
| 3,103,975 A | 9/1963 | Hanson |
| 3,104,711 A | 9/1963 | Haagensen |
| 3,114,875 A | 12/1963 | Haagensen |
| 3,133,592 A | 5/1964 | Tomberiin |
| 3,137,347 A | 6/1964 | Parker |
| 3,149,672 A | 9/1964 | Joseph et al. |
| 3,169,577 A | 2/1965 | Erich |
| 3,170,519 A | 2/1965 | Haagensen |
| 3,211,220 A | 10/1965 | Erich |
| 3,428,125 A | 2/1969 | Parker |
| 3,522,848 A | 8/1970 | New |
| 3,547,192 A | 12/1970 | Claridge et al. |
| 3,547,193 A | 12/1970 | Gill |
| 3,642,066 A | 2/1972 | Gill |
| 3,696,866 A | 10/1972 | Dryden |
| 3,735,336 A | 5/1973 | Long |
| 3,862,662 A | 1/1975 | Kern |
| 3,874,450 A | 4/1975 | Kern |
| 3,931,856 A | 1/1976 | Barnes |
| 3,946,809 A | 3/1976 | Hagedorn |
| 3,948,319 A | 4/1976 | Pritchett |
| 4,008,762 A | 2/1977 | Fisher et al. |
| 4,010,799 A | 3/1977 | Kern et al. |
| 4,019,575 A | 4/1977 | Pisio |
| 4,084,637 A | 4/1978 | Todd |
| 4,135,579 A | 1/1979 | Rowland et al. |
| 4,140,179 A | 2/1979 | Kasevich et al. |
| 4,140,180 A | 2/1979 | Bridges et al. |
| 4,144,935 A | 3/1979 | Bridges et al. |
| 4,185,691 A | 1/1980 | Tubin et al. |
| 4,193,448 A | 3/1980 | Jearnbey |
| 4,193,451 A | 3/1980 | Dauphine |
| 4,196,329 A | 4/1980 | Rowland et al. |
| 4,199,025 A | 4/1980 | Carpenter |
| 4,265,307 A | 5/1981 | Elkins |
| RE30,738 E | 9/1981 | Bridges et al. |
| 4,301,865 A | 11/1981 | Kasevich et al. |
| 4,320,801 A | 3/1982 | Rowland et al. |
| 4,373,581 A | 2/1983 | Toellner |
| 4,396,062 A | 8/1983 | Iskander |
| 4,412,585 A | 11/1983 | Bouck |
| 4,437,519 A | 3/1984 | Cha |
| 4,449,585 A | 5/1984 | Bridges et al. |
| 4,457,365 A | 7/1984 | Kasevich et al. |
| 4,462,699 A | 7/1984 | Herbert et al. |
| 4,470,459 A | 9/1984 | Copland |
| 4,476,926 A | 10/1984 | Bridges et al. |
| 4,484,627 A | 11/1984 | Perkins |
| 4,485,868 A | 12/1984 | Sresty et al. |
| 4,485,869 A | 12/1984 | Sresty et al. |
| 4,487,257 A | 12/1984 | Dauphine |
| 4,495,990 A | 1/1985 | Titus et al. |
| 4,498,535 A | 2/1985 | Bridges |
| 4,499,948 A | 2/1985 | Perkins |
| 4,508,168 A | 4/1985 | Heeren |
| 4,513,815 A | 4/1985 | Rundell et al. |
| 4,524,826 A | 6/1985 | Savage |
| 4,524,827 A | 6/1985 | Bridges et al. |
| 4,545,435 A | 10/1985 | Bridges et al. |
| 4,553,592 A | 11/1985 | Looney et al. |
| 4,576,231 A | 3/1986 | Dowling et al. |
| 4,583,589 A | 4/1986 | Kasevich |
| 4,592,423 A | 6/1986 | Savage et al. |
| 4,612,988 A | 9/1986 | Segalman |
| 4,620,593 A | 11/1986 | Haagensen |
| 4,660,636 A | 4/1987 | Rundell et al. |
| 4,701,015 A | 10/1987 | Saito |
| 4,705,108 A | 11/1987 | Little et al. |
| 4,717,253 A | 1/1988 | Pratt |
| 4,756,627 A | 7/1988 | Nelson |
| 4,817,711 A | 4/1989 | Jearnbey |
| 4,819,723 A | 4/1989 | Whitfill |
| 4,853,507 A | 8/1989 | Samardzija |
| 5,013,126 A | 5/1991 | Hattori |
| 5,039,192 A | 8/1991 | Basu |
| 5,055,180 A | 10/1991 | Klaila |
| 5,068,819 A | 11/1991 | Misra et al. |
| 5,072,087 A | 12/1991 | Apte |
| 5,082,054 A | 1/1992 | Kiamanesh |
| 5,236,039 A | 8/1993 | Edelstein et al. |
| 5,367,157 A | 11/1994 | Nilsson |
| 5,623,576 A | 4/1997 | Deans |
| 5,899,274 A | 5/1999 | Frauenfeld et al. |
| 6,041,860 A | 3/2000 | Nazzal et al. |
| 6,056,882 A | 5/2000 | Scalliet |
| 6,077,400 A | 6/2000 | Kartchner |
| 6,189,611 B1 | 2/2001 | Kasevich |
| 6,214,236 B1 | 4/2001 | Scalliet |
| 6,285,014 B1 | 9/2001 | Beck et al. |
| 6,332,500 B1 | 12/2001 | Ellefsen |
| 6,387,327 B1 | 5/2002 | Ricci |
| 6,405,802 B1 | 6/2002 | Williams |
| 6,413,399 B1 | 7/2002 | Kasevich |
| 6,544,411 B2 | 4/2003 | Varandaraj |
| 6,597,446 B2 | 7/2003 | Klooster et al. |
| 6,678,616 B1 | 1/2004 | Winkler et al. |
| 6,755,262 B2 | 6/2004 | Parker |
| 6,814,141 B2 | 11/2004 | Huh et al. |
| 6,888,097 B2 | 5/2005 | Batarseh |
| 6,932,155 B2 | 8/2005 | Vinegar |
| 7,024,081 B2 | 4/2006 | Dowd |
| 7,048,051 B2 | 5/2006 | McQueen |
| 7,091,460 B2 | 8/2006 | Kinzer |
| 7,109,457 B2 | 9/2006 | Kinzer |
| 7,115,847 B2 | 10/2006 | Kinzer |
| 7,131,498 B2 | 11/2006 | Campo et al. |
| 7,147,064 B2 | 12/2006 | Batarseh et al. |
| 7,312,428 B2 | 12/2007 | Kinzer |
| 7,331,385 B2 | 2/2008 | Symington |
| 7,445,041 B2 | 11/2008 | O'Brien |
| 7,461,693 B2 | 12/2008 | Considine et al. |
| 7,484,561 B2 | 2/2009 | Bridges |
| 7,486,248 B2 | 2/2009 | Halek et al. |
| 7,562,708 B2 | 7/2009 | Cogliandro et al. |
| 7,629,497 B2 | 12/2009 | Pringle |
| 7,631,691 B2 | 12/2009 | Symington et al. |
| 7,668,419 B2 | 2/2010 | Taverner |
| 7,677,673 B2 | 3/2010 | Tranquilla et al. |
| 7,719,676 B2 | 5/2010 | DiFoggio |
| 7,775,961 B2 | 8/2010 | Meikrantz |
| 7,828,057 B2 | 11/2010 | Kearl et al. |
| 7,891,416 B2 | 2/2011 | Pankratz et al. |
| 7,909,096 B2 | 3/2011 | Clark et al. |
| 8,096,349 B2 | 1/2012 | Considine et al. |
| 8,210,256 B2 | 7/2012 | Bridges et al. |
| 8,378,275 B2 | 2/2013 | Novak |
| 8,431,015 B2 | 4/2013 | Banerjee |
| 8,485,254 B2 | 7/2013 | Huber et al. |
| 8,526,171 B2 | 9/2013 | Wu et al. |
| 8,555,969 B2 | 10/2013 | Goodwin et al. |
| 8,586,898 B2 | 11/2013 | Novak |
| 8,678,087 B2 | 3/2014 | Schultz et al. |
| 8,824,240 B2 | 9/2014 | Roberts et al. |
| 8,826,973 B2 | 9/2014 | Moxley et al. |
| 8,925,627 B2 | 1/2015 | Tupper et al. |
| 8,960,215 B2 | 2/2015 | Cui et al. |
| 9,075,155 B2 | 7/2015 | Luscombe et al. |
| 9,080,949 B2 | 7/2015 | Mestayer et al. |
| 9,217,291 B2 | 12/2015 | Batarseh |
| 9,255,836 B2 | 2/2016 | Taverner et al. |
| 9,322,255 B2 | 4/2016 | Diehl et al. |
| 9,353,612 B2 | 5/2016 | Batarseh |
| 9,528,364 B2 | 12/2016 | Samuel et al. |
| 9,546,548 B2 | 1/2017 | Hartog |
| 9,567,819 B2 | 2/2017 | Cavender et al. |
| 9,584,711 B2 | 2/2017 | Tjhang et al. |
| 9,644,464 B2 | 5/2017 | Batarseh |

(56) References Cited

U.S. PATENT DOCUMENTS

| | | | |
|---|---|---|---|
| 9,690,376 B2 | 6/2017 | Davis et al. | |
| 9,765,609 B2 | 9/2017 | Chemali et al. | |
| 10,012,758 B2 | 7/2018 | Speck et al. | |
| 10,163,213 B2 | 12/2018 | Boyle et al. | |
| 10,330,915 B2 | 6/2019 | Rudolf et al. | |
| 10,641,079 B2 | 5/2020 | Aljubran et al. | |
| 10,732,020 B1* | 8/2020 | Spriggs | G01F 23/292 |
| 10,941,644 B2 | 3/2021 | Aljubran et al. | |
| 2003/0075339 A1 | 4/2003 | Gano | |
| 2003/0098605 A1 | 5/2003 | Vinegar | |
| 2003/0173072 A1 | 9/2003 | Vinegar | |
| 2004/0256103 A1 | 12/2004 | Batarseh | |
| 2005/0199386 A1 | 9/2005 | Kinzer | |
| 2005/0207938 A1 | 9/2005 | Hanawa | |
| 2006/0012785 A1 | 1/2006 | Funk et al. | |
| 2006/0076347 A1 | 4/2006 | Kinzer | |
| 2006/0102343 A1 | 5/2006 | Skinner et al. | |
| 2006/0102625 A1 | 5/2006 | Kinzer | |
| 2006/0106541 A1 | 5/2006 | Hassan et al. | |
| 2007/0000662 A1 | 1/2007 | Symington et al. | |
| 2007/0108202 A1 | 5/2007 | Kinzer | |
| 2007/0131591 A1 | 6/2007 | Pringle | |
| 2007/0131594 A1 | 6/2007 | Hakola | |
| 2007/0137852 A1 | 6/2007 | Considine et al. | |
| 2007/0137858 A1 | 6/2007 | Considine et al. | |
| 2007/0153626 A1 | 7/2007 | Hayes et al. | |
| 2007/0181301 A1 | 8/2007 | O'Brien | |
| 2007/0187089 A1 | 8/2007 | Bridges | |
| 2007/0193744 A1 | 8/2007 | Bridges | |
| 2007/0204994 A1 | 9/2007 | Wimmersperg | |
| 2007/0261844 A1 | 11/2007 | Cogliandro et al. | |
| 2007/0267191 A1 | 11/2007 | Pfeiffer | |
| 2007/0284107 A1 | 12/2007 | Crichlow | |
| 2007/0289736 A1 | 12/2007 | Kearl et al. | |
| 2008/0073079 A1 | 3/2008 | Tranquilla et al. | |
| 2008/0111064 A1 | 5/2008 | Andrews et al. | |
| 2008/0173443 A1 | 7/2008 | Symington et al. | |
| 2009/0008079 A1 | 1/2009 | Zazovsky | |
| 2009/0071646 A1 | 3/2009 | Pankratz et al. | |
| 2009/0209825 A1 | 8/2009 | Efinger et al. | |
| 2009/0252842 A1 | 10/2009 | Wang | |
| 2009/0259446 A1 | 10/2009 | Zhang et al. | |
| 2009/0288820 A1 | 11/2009 | Barron et al. | |
| 2009/0296778 A1 | 12/2009 | Kinugasa et al. | |
| 2010/0044103 A1 | 2/2010 | Moxley et al. | |
| 2010/0089584 A1 | 4/2010 | Burns | |
| 2010/0095742 A1 | 4/2010 | Symington et al. | |
| 2010/0186955 A1 | 7/2010 | Saasen et al. | |
| 2010/0296100 A1 | 11/2010 | Blacklaw | |
| 2011/0011576 A1 | 1/2011 | Cavender et al. | |
| 2012/0000642 A1 | 1/2012 | Betzer Tsilevich | |
| 2012/0012319 A1 | 1/2012 | Dennis | |
| 2012/0048118 A1 | 3/2012 | Hess | |
| 2012/0075615 A1 | 3/2012 | Niclass et al. | |
| 2012/0169841 A1 | 6/2012 | Chemali et al. | |
| 2012/0181020 A1 | 7/2012 | Barron et al. | |
| 2012/0312538 A1 | 12/2012 | Koolman | |
| 2013/0008653 A1 | 1/2013 | Schultz et al. | |
| 2013/0037268 A1 | 2/2013 | Kleefisch et al. | |
| 2013/0126164 A1 | 5/2013 | Sweatman et al. | |
| 2013/0191029 A1 | 7/2013 | Heck, Sr. | |
| 2013/0213637 A1 | 8/2013 | Kearl | |
| 2013/0213795 A1 | 8/2013 | Strohm et al. | |
| 2013/0255936 A1 | 10/2013 | Statoilydro et al. | |
| 2014/0034144 A1 | 2/2014 | Cui et al. | |
| 2014/0050619 A1 | 2/2014 | Meller | |
| 2014/0090846 A1 | 4/2014 | Deutch | |
| 2014/0110118 A1 | 4/2014 | Hocking | |
| 2014/0199017 A1 | 7/2014 | Den Boer et al. | |
| 2014/0231147 A1 | 8/2014 | Bozso et al. | |
| 2014/0240951 A1 | 8/2014 | Brady et al. | |
| 2014/0278111 A1 | 9/2014 | Gerrie et al. | |
| 2014/0360778 A1 | 12/2014 | Batarseh | |
| 2015/0275636 A1 | 10/2015 | Diehl et al. | |
| 2015/0308248 A1 | 10/2015 | Diehl et al. | |
| 2015/0355015 A1 | 12/2015 | Crickmore et al. | |
| 2016/0153240 A1 | 6/2016 | Braga et al. | |
| 2016/0223389 A1 | 8/2016 | Farhadiroushan et al. | |
| 2016/0247316 A1 | 8/2016 | Whalley et al. | |
| 2017/0044889 A1 | 2/2017 | Rudolf et al. | |
| 2017/0097305 A1 | 4/2017 | Prinz | |
| 2017/0234104 A1 | 8/2017 | James | |
| 2017/0260847 A1 | 9/2017 | Xia et al. | |
| 2018/0010419 A1 | 1/2018 | Livescu et al. | |
| 2018/0156600 A1 | 6/2018 | Cable et al. | |
| 2018/0266226 A1 | 9/2018 | Batarseh et al. | |
| 2020/0024926 A1 | 1/2020 | Reinas et al. | |
| 2020/0048966 A1 | 2/2020 | Batarseh | |
| 2020/0134773 A1 | 4/2020 | Pinter et al. | |
| 2020/0190967 A1 | 6/2020 | Gooneratne et al. | |
| 2020/0210680 A1* | 7/2020 | Shreve | G06T 7/55 |
| 2020/0224524 A1 | 7/2020 | Parmeshwar et al. | |
| 2020/0319108 A1 | 10/2020 | Butte et al. | |
| 2020/0325764 A1* | 10/2020 | Ruehmann | E21B 19/165 |
| 2021/0054721 A1 | 2/2021 | Batarseh | |
| 2021/0115781 A1 | 4/2021 | Stark | |
| 2021/0156243 A1 | 5/2021 | Aljubran et al. | |

FOREIGN PATENT DOCUMENTS

| | | |
|---|---|---|
| CN | 102493813 | 6/2012 |
| CN | 203081295 | 7/2013 |
| CN | 203334954 | 12/2013 |
| CN | 103591927 | 2/2014 |
| CN | 104295448 | 1/2015 |
| CN | 204627586 | 9/2015 |
| CN | 107462222 | 12/2017 |
| CN | 110847970 | 2/2020 |
| EP | 2317068 | 5/2011 |
| EP | 2737173 | 6/2014 |
| GB | 2230109 | 10/1990 |
| WO | WO 2008146017 | 12/2008 |
| WO | WO 2009020889 | 2/2009 |
| WO | WO 2011038170 | 3/2011 |
| WO | WO 2011101739 | 8/2011 |
| WO | WO 2012038814 | 3/2012 |
| WO | WO 2012136951 | 10/2012 |
| WO | WO 2013155061 | 10/2013 |
| WO | WO 2014171960 | 10/2014 |
| WO | WO 2014189533 | 11/2014 |
| WO | WO 2014201313 | 12/2014 |
| WO | WO 2015095155 | 6/2015 |
| WO | WO 2015140636 | 9/2015 |
| WO | WO 2015142330 | 9/2015 |
| WO | WO 2016148687 | 9/2016 |
| WO | WO 2017011078 | 1/2017 |
| WO | WO 2017095575 | 6/2017 |
| WO | WO 2018169991 | 9/2018 |
| WO | WO 2018222541 | 12/2018 |
| WO | WO 2019171082 | 9/2019 |

OTHER PUBLICATIONS

Al-Nakhli et al., "Enhanced Oil Recovery by In-Situ Steam Generation," U.S. Appl. No. 61/652,359, filed Jun. 7, 2010, 25 pages.
Antony et al., "Photonics and fracture toughness of heterogeneous composite materials," 2017, Scientific Reports, 7:4539, 8 pages.
Batarseh et al., "Downhole high-power laser tools development and evolutions," presented at the Abu Dhabi International Petroleum & Exhibition Conference, Abu Dhabi, United Arab Emirates, Nov. 12-15, 2018, 15 pages.
Batarseh et al., "High power laser application in openhole multiple fracturing with an overview of laser research; Past, present and future," presented at the SPE Saudi Arabia Section Technical Symposium and Exhibition, Khobar, Saudi Arabia, Apr. 8-11, 2012, Society of Petroleum Engineers, 10 pages.
Batarseh et al., "Laser Gun: The Next Perforation Technology," presented at the SPE Middle East Oil & Gas Show and Conference, Manama, Bahrain, Mar. 18-21, 2019, 15 pages.
Batarseh et al., "Microwave With Assisted Ceramic Materials to Maximize Heat Penetration and Improve Recovery Efficiency of (56) References Cited

OTHER PUBLICATIONS

Heavy Oil Reservoirs," presented at the SPE Middle East Oil & Gas Show and Conference, Kingdom of Bahrain, Mar. 6-9, 2017, 24 pages.
Batarseh et al., "Well Perforation Using High-Power Lasers," presented at the SPE Annual Technical Conference and Exhibition, Denver, Colorado, Oct. 5-8, 2003, 10 pages.
Berkowitz et al., "Extraction of Oil Sand Bitmens with Supercritical Water"; Fuel Processing Technology, 25: 1 (33-44), Apr. 1, 1990, 12 pages.
Bientinesi et al., "A New Technique for Heavy Oil Recovery Based on Electromagnetic Heating: Pilot Scale Experimental Validation"; Chemical Engineering Transactions, 32 (2287-2292), Jun. 2, 2013, 6 pages.
Boinott et al., "High resolution geomechanical profiling in heterogeneous source rock from the Vaca Muerta Formation, Neuquen Basin, Argentina," presented at the 52nd US Rock Mechanics/Geomechanics Symposium, Seattle, Washington, USA, American Rock Mechanics Association, Jun. 17-20, 2018, 8 pages.
Born et al., "Principles of Optics: Electromagnetic Theory of Propagation, Interference and Diffraction of Light," 6th ed. Pergamon Press, 808 pages.
Caryotakis, "The klystron: A microwave source of surprising range and endurance." The American Physical Society, Division of Plasma Physics Conference in Pittsburg, PA, Nov. 1997, 14 pages.
Cerutti et al.; "A New Technique for Heavy Oil Recovery Based on Electromagnetic Heating: System Design and Numerical Modelling"; Chemical Engineering Transaction, 32:1255-1260, Dec. 31, 2013, 6 pages.
Frank, "Discriminating between coherent and incoherent might with metasurfaces," Jul. 2018, 11 pages.
Gemmeke and Ruiter, "3D ultrasound computer tomography for medical imagining," Nuclear Instruments and Methods in Physics Research A 580, Oct. 1, 2007, 9 pages.
Ghatak and Thyagarajan, "An introduction to Fiber Optics," Cambridge University Press, 1st Ed., Jun. 28, 1998, 6 pages.
Graves et al., "Temperatures Induced by High Power Lasers: Effects on Reservoir Rock Strength and Mechanical Properties," presented at the SPE/ISRM Rock Mechanics Conference, Irvine, Texas, Oct. 20-23, 2002, 7 pages.
Guo et al., "Convolutional Neural Networks for Steady Flow Approximation," presented at the 22nd ACM SIGKDD International Conference on Knowledge Discovery and Data Mining—KDD, San Francisco, California, Aug. 13-17, 2016, 10 pages.
Hveding et al., "Integrated Applications of Fiber-Optic Distributed Acoustic and Temperature Sensing," SPE Latin American and Caribbean Petroleum Engineering Conference, Nov. 20, 2015, 16 pages.
Johnson, "Design and Testing of a Laboratory Ultrasonic Data Acquisition System for Tomography" Thesis for the degree of Master of Science in Mining and Minerals Engineering, Virginia Polytechnic Institute and State University, Dec. 2, 2004, 108 pages.
Li et al., "Application of carbon nanocatalysts in upgrading heavy cmde oil assisted with microwave heating," Nano letters, 2014, 14.6: 3002-3008, 7 pages.
Mutyala et al., "Microwave applications to oil sands and petroleum: A review," Fuel Processing Technology, 2010, 91:127-135, 9 pages.
Nourbakhsh et al., "Embedded sensors and feedback loops for iterative improvement in design synthesis for additive manufacturing," presented at the ASME 2016 International Design Engineering Technical Conference and Information in Engineering Conference, Charlotte, NC, 9 pages.
O-brien et al. et al., "StarWars Laser Technology for Gas Drilling and Completions in the 21st Century," presented at the SPE Annual Technical Conference and Exhibition, Houston, Texas, Oct. 3-6, 1999, 10 pages.
Ruiter et al., "3D ultrasound computer tomography of the breast: A new era?" European Journal of Radiology 81S1, Sep. 2012, 2 pages.
Salehi et al., "Laser drilling—drilling with the power of light," Gas Technology Institute Report, 2000-2007 period report, Chicago, IL, 318 pages.
San-Roman-Alerigi et al., "Machine learning and the analysis of high-power electromagnetic interaction with subsurface matter," presented at the SPE Middle East Oil and Gas Show and Conference, Manama, Bahrain, Mar. 18-21, 2019, 11 pages.
San-Roman-Alerigi et al., "Geomechanical and thermal dynamics of distributed and far-field dielectric heating of rocks assisted by nano-enablers—A numerical exploration," presented at the SPE Abu Dhabi International Petroleum Exhibition and Conference, Abu Dhabi, UAE, Nov. 13-16, 2017, 21 pages.
San-Roman-Alerigi et al., "Numerical Modeling of Thermal and Mechanical Effects in Laser-Rock Interaction—An Overview," presented at the 50th U.S. Rock Mechanics/Geomechanics Symposium, Houston, TX, Jun. 26-29, 2016; American Rock Mechanics Association, 2016, 11 pages.
Towarddatascience.com [online], "Support vector machine—introduction to machine learning algorithms," Ghandi, Jul. 7, 2018, retrieved May 19, 2021, retrieved from URL <https://towardsdatascience.com/support-vector-machine-introduction-to-machine-learning-algorithms-934a444fca47>, 12 pages.
Towardsdatascience.com [online], "K-Means Clustering—Explained," Yildrim, Mar. 2020, retrieved on May 19, 2021, retrieved from URL <https://towardsdatascience.com/k-means-clustering-explained-4528df86a120#:~:text-K%2Dmeans%20clustering%20aims%20to,methods%20to%20measure%20the%20distance>, 12 pages.
Vaferi et al., "Modeling and analysis of effective thermal conductivity of sandstone at high pressure and temperature using optimal artificial neural networks," Journal of Petroleum Science and Engineering, 2014, 119, 10 pages.
Zinati, "Using Distributed Fiber-Optic Sensing Systems to Estimate Inflow and Reservoir Properties," Technische Universiteit Delft, 2014, 135 pages.
PCT International Search Report and Written Opinion in International Appln. No. PCT/US2022/072537, dated Sep. 8, 2022, 16 pages.

\* cited by examiner

CONTACTLESS REAL-TIME 3D MAPPING OF SURFACE EQUIPMENT

TECHNICAL FIELD

The present disclosure applies to determining the condition of equipment.

BACKGROUND

Wellheads and surface structures are subject to complex forces and thermal gradients that cause structural changes or damage including, for example, anisotropic dilation, fatigue, displacement, among others. These effects may damage the platform, the wellhead, or both. Conventional systems may measure structural changes manually as part of routine inspections, and times that measurements are taken may be sporadic due to the number of wells and their locations.

SUMMARY

The present disclosure describes techniques that can be used for using a photonic sensing system to characterize the structural displacements of wellheads. In some implementations, a computer-implemented method includes the following. A three-dimensional (3D) point cloud of one or more objects is generated by an analysis and presentation system using light information collected through structured light illumination by an array of structured-light sensors (SLSes) directed toward the one or more objects. Generating the point cloud includes defining points of the 3D point cloud that are relative to reference points on the one or more objects. Real-time contactless 3D surface measurements of the one or more objects are performed using the 3D point cloud. Changes in one or more parts of the one or more objects are determined by the an analysis and presentation system by analyzing the real-time contactless 3D surface measurements.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. The techniques of the present disclosure using a photonic sensing system can be used to provide a high-accuracy, high-speed, and contactless method to characterize deformations of surface structures, for example, in oil and gas applications. The techniques can also be used to characterize material changes and contamination by means of absorbance or cross-polarized spectrometry. Structured light sensing can be used to characterize deformations in real-time and in a contactless way. The term real-time can correspond to events that occur within a specified period of time, for example, within a few seconds or under one minute. The techniques can be used in the ongoing development of tools and methods for wellhead deformation characterization, for example, in upstream photonics program and advanced sensors program, and wellhead displacement analysis. The techniques of the present disclosure can solve the problems of conventional systems by improving the resolution of results and reducing the acquisition speed. The techniques can be used to generate a three dimensional (3D) point cloud (of equipment surfaces, for example) using structured light. Further, the techniques can be used to: characterize axial, radial, and azimuthal deformations; characterize mechanical tension and strain by analyzing cross polarized spectra of reflected beams (for example, with the probing beam being elliptically polarized); identify material degradation and contamination by using reflectance spectroscopy; and derive correlations between displacement, temperature, and flow rates. The techniques can be expanded, modified, or customized to characterize displacement of other surface equipment. This provides an advantage over conventional systems, for example, that are typically reactive and may be slower to react to problems associated with equipment.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for providing a photonic sensing system to perform an automated method to characterize displacement of equipment surfaces and monitor changes in real-time. For example, a method and a system can be used for contactless three-dimensional (3D) surface measurement based on structured light illumination. Laser-patterned illumination can be used to obtain a real-time three-dimensional map of surface equipment (for example, wellheads, production tubing, and manifolds). The term real-time can correspond to events that occur within a specified period of time, for example, within a few seconds or under one minute. The real-time map can be used to track the relative change in position of known markers on the surface of an object. The process creates a point cloud that can be used to derive structural properties and changes, such as displacements, deformations, and stress/strain states. In addition the use of different laser wavelengths or hyperspectral structured light illumination can enable a real-time monitoring of material accretion (contamination) and degradation. The techniques can be incorporated into, or used with, monitoring systems used in the petrochemical industry, such as gas operations, including offshore gas wells.

Various modifications, alterations, and permutations of the disclosed implementations can be made and will be readily apparent to those of ordinary skill in the art, and the general principles defined may be applied to other implementations and applications, without departing from scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

Figure 1:
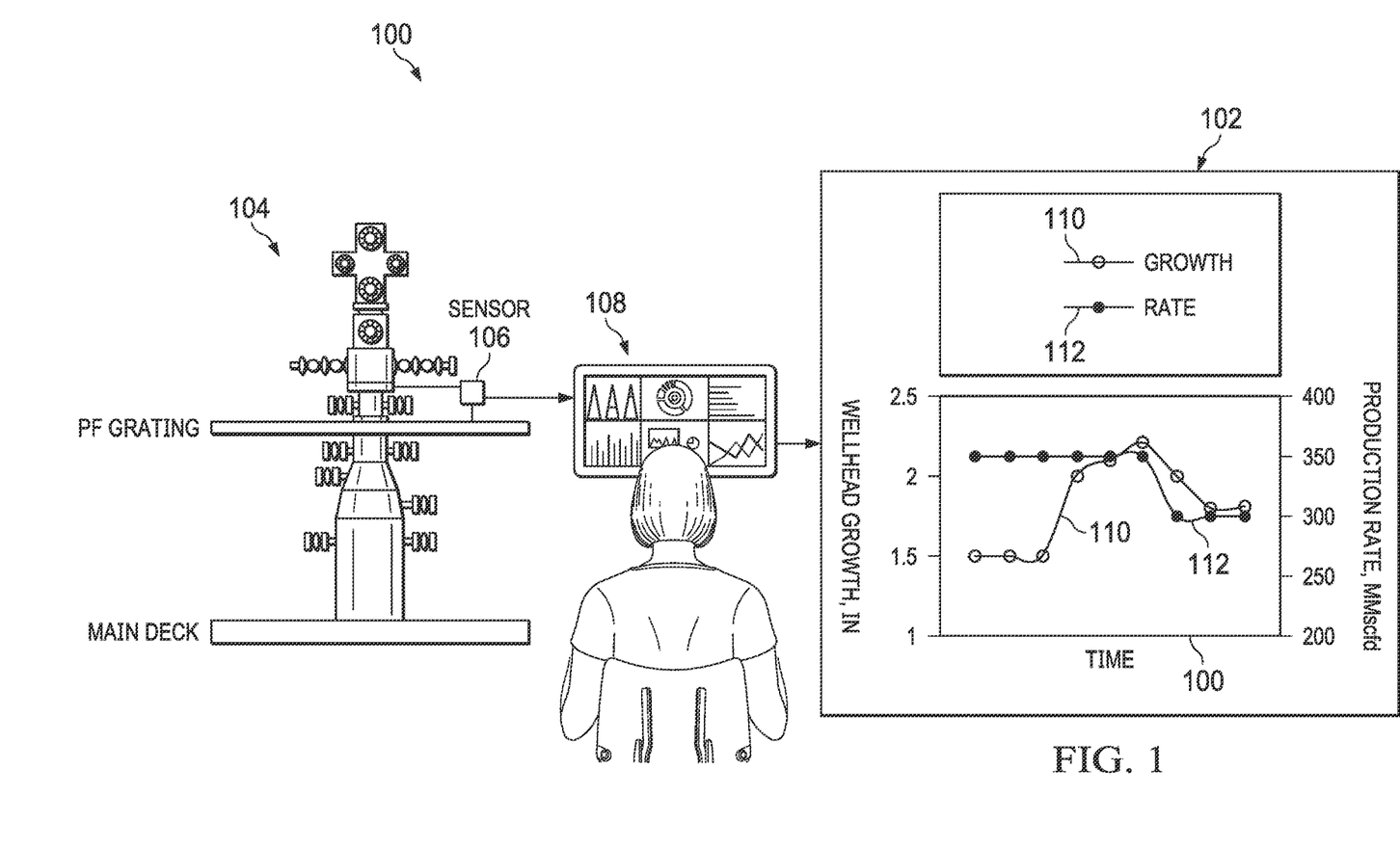
FIG. 1 is diagram of an example of a photonic sensing system for characterizing the displacement, according to some implementations of the present disclosure.

FIG. 1 is diagram of an example of a photonic sensing system 100 for characterizing the displacement, according to some implementations of the present disclosure. The photonic sensing system 100 can provide remote sensing and can use a workflow, for example, that enables the real-time and contactless monitoring the growth 102 of a wellhead 104. The photonic sensing system 100 can include a single sensor 106 or an array (or group) of sensors 106, a data transmission system, a computerized data collection system, and toolboxes (for example, user interfaces 108) for visualization and data analytics. A user interface 108 used by a user can present growth 102 (for example, in inches (in.)), for example, as one or more graphs showing changes in a wellhead growth 108 and a production rate 110 (for example, in thousands of standard cubic feet per day (MMSCFD)) over time 114 (for example, in weeks, months, or years).

The photonic sensing system 100 can include an array of structured-light sensors (SLSes) (for example, the sensors 106) that are directed toward one or more objects, such as equipment at a wellhead 104. A computerized data collection system configured to collect light information from the array of SLSes. The light information collected from the array of SLSes can be used by an analysis and presentation system for providing analysis and visualization of the light information. A data transmission system can transmit information between the array of SLSes, the computerized data collection system, and the analysis and presentation system.

The spatial resolution of the sensor can be, for example, $100 \times 10^{-6}$ m (or 100 µm), or 100 micrometers, with a repetition rate in the order of ≥60 Hz, for example. The data telecommunication can be attained using mobile networks (for example, Global System for Mobile Communications (GSM) or generations 4G or 5G), mesh wireless network, or fiber optics.

Figure 2:
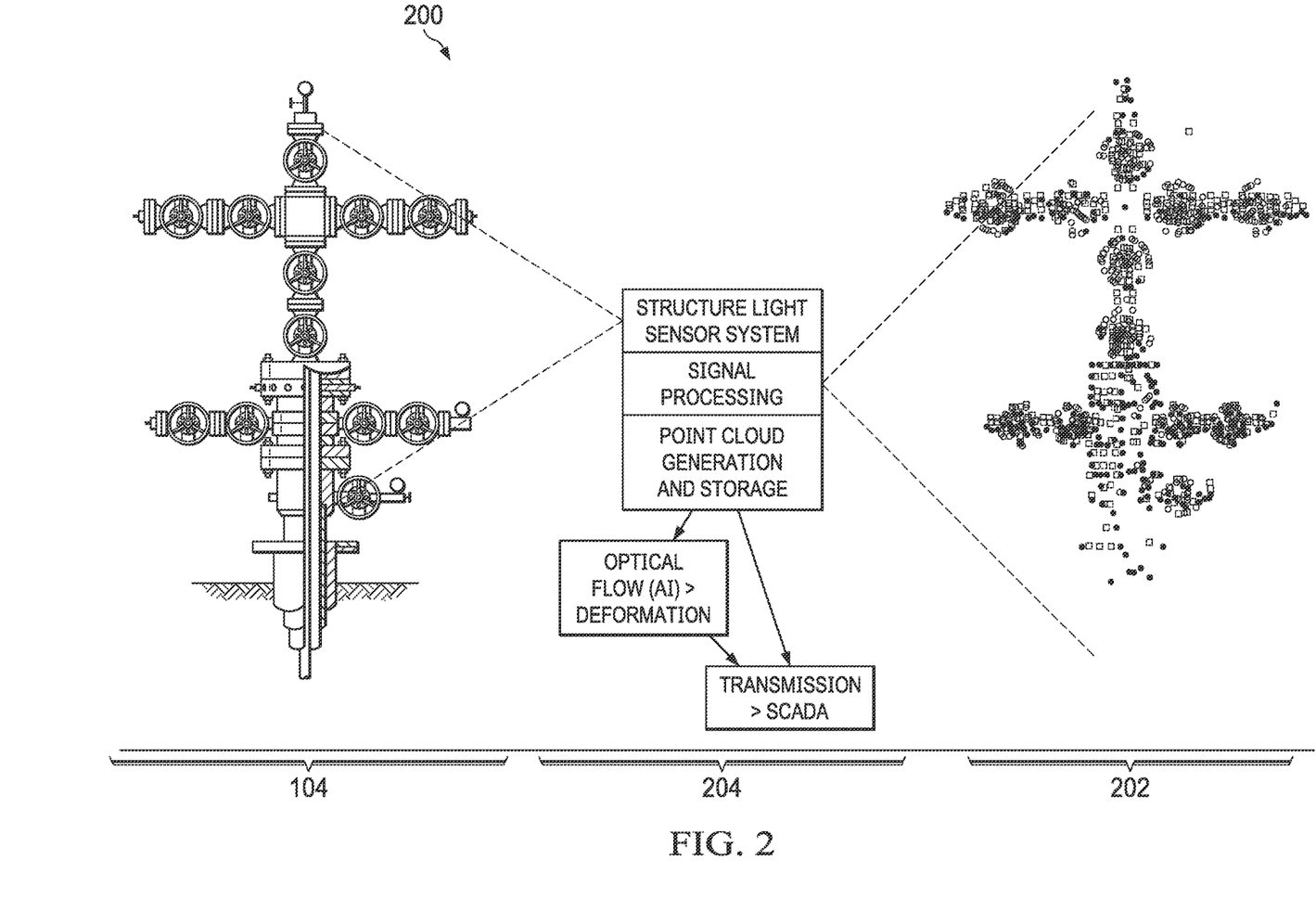
FIG. 2 is a diagram of a photonic sensing system used in a sensing and characterization process, according to some implementations of the present disclosure.

FIG. 2 is a diagram of a photonic sensing system 200 used in a sensing and characterization process, according to some implementations of the present disclosure. The photonic sensing system 200 can generate a point cloud of the wellhead 104, for example. Generating the point cloud 102 can include system features 204 including a structured light sensor system, signal processing, point cloud generation and storage, including using an optical flow (for example, using artificial intelligence (AI)) to determine deformations and transmission to supervisory control and data acquisition (SCADA) systems. The process can take place before integrating with a SCADA system. The process can use post-analysis routines and a machine learning engine. The photonic sensing system 200 can use a structure light, multi-laser ranging, laser-array ranging, or laser-patterned beam array ranging to obtain a point cloud P of n points whose coordinates can be, for example:

$$\{\vec{r}_i\}, i=1, \ldots, n \tag{1}$$

describing the surface of an object for a range $\{\vec{r}_i\}$ using index i from 1 to n. The photonic sensing system 200 can also record k scalar quantities associated with each point P as a function of illumination wavelength ($\lambda$), such that:

$$P=\{(x_i, y_i, z_i, f_i^1(\lambda), \ldots, f_i^k(\lambda))\} \tag{2}$$

Note that $f_i(x_i, y_i, z_i; \lambda_j)$ is the scalar quantity (for example, an absorbance function). The device can transmit the point cloud data directly to a central processing authority. Alternatively, the device can incorporate an edge-computer to perform analysis in-situ and transfer that data to the central processing authority. In the latter case, the raw data can be stored (either partially or full) or transmitted as needed. The central processing authority or edge computing system can perform the calculation of the optical flow calculation between the point clouds of two subsequent acquisition times. The process can involve calculation of the L2 norm between the spatial position of the same point (referenced to the structure) in two subsequent frames (displacement potential), and/or the gradient (or displacement field velocity). In addition, the photonic sensing system 200 can also perform a calculation of the divergence of the displacement field.

The photonic sensing system 200 can provide a point cloud capturing process, analysis, and transmission. Basic analysis can be conducted at the edge by incorporating a neural engine that calculates the optical flow of the point cloud between two subsequent acquisitions. Alternatively, data can be transmitted to a central processing authority. The information can provide the transient change in position/displacement. The data can further be utilized in other analytics toolboxes to correlate and predict flow using the data available through a SCADA system.

Figure 3:
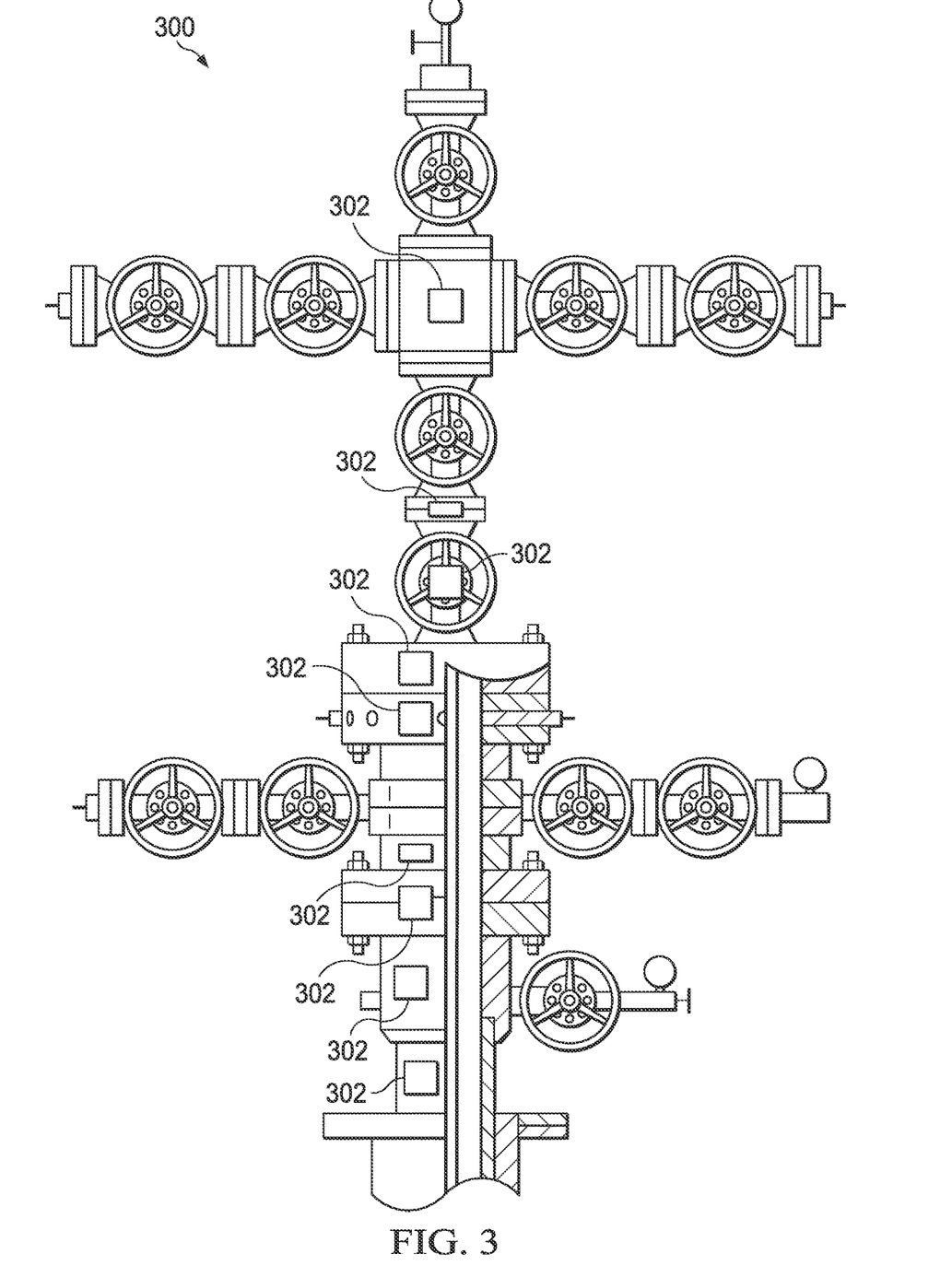
FIG. 3 is diagram showing examples of locations of beacons in a wellhead, according to some implementations of the present disclosure.

FIG. 3 is diagram showing examples of locations of beacons 302 in a wellhead 300, according to some implementations of the present disclosure. The beacons 302 can be used in the photonic sensing system 200, for example. In some implementations, the beacons 302 (or tracers), depicted as white squares in FIG. 3, can be placed in known positions of the wellhead 300 to serve as references or anchors in the calculations associated with FIG. 3.

Figure 4:
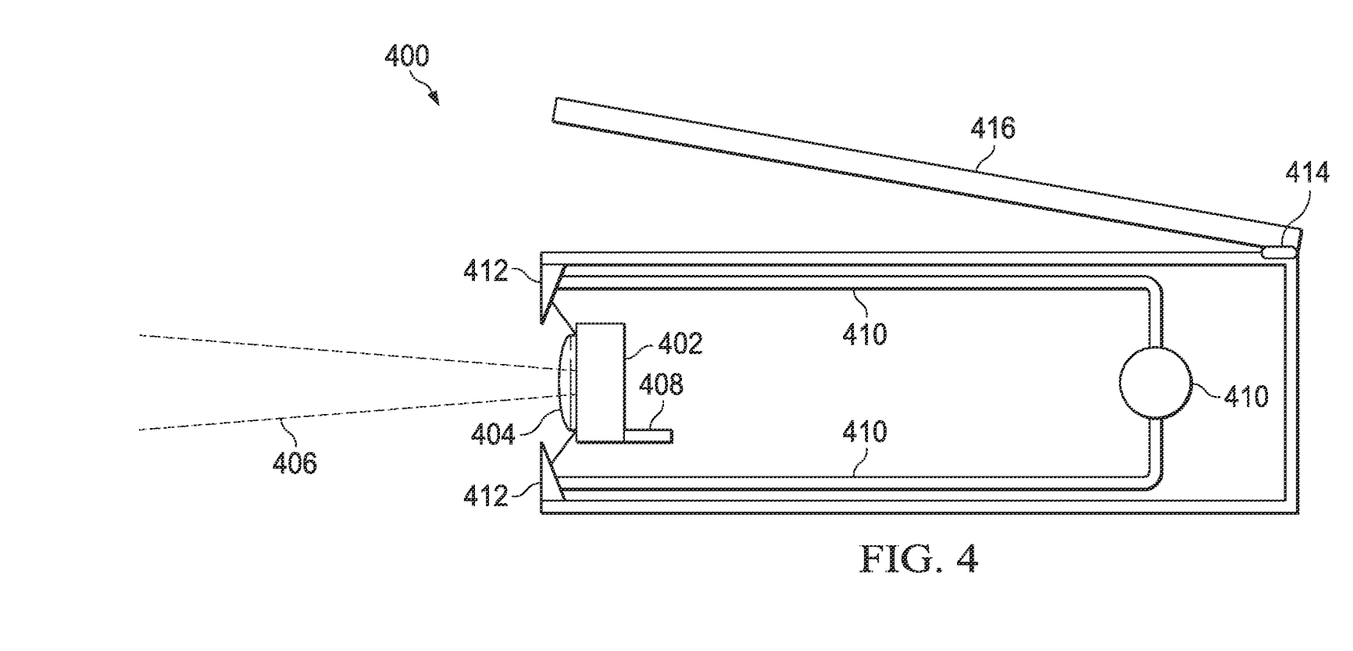
FIG. 4 is a schematic representation of an example structure of a photonic sensor, according to some implementations of the present disclosure.

FIG. 4 is a schematic representation of an example structure of a photonic sensor 400, according to some implementations of the present disclosure. The photonic sensor 400 includes field housing components 402a-402g ("S1" to "S7"). A sensor 402 can be a patterned light sensor and receiver (for example, commercially available). A lens 404 can be made of titanium dioxide/silicon dioxide (TiO2/SiO2), TiO2/diamond, titanium dioxide TiO2/IRFS (infrared fused silica glass), or hierarchical diamond/diamond window, where the TiO2 layer is used for self-cleaning. A beam 406 can be the beam that is projected and reflected to and from the measurement target. A cooler 408 can be a thermoselectric cooler and heat sink with air circulation to maintain the device operation below a threshold temperature, for example, 50 degrees Celsius (C). Air components 410 can include an air pump and conduits. Circulated air can serve at least two purposes, including keeping the photonic sensor 400 cool and cleaning the window using ionized air nozzles 412. Power components 414 can include an electric power supply and battery (for example, Lithium (Li)-Ion or hydrogen cell). A housing 416 can house a high gain and high temperature photocell, for example, using Gallium Nitride (GaN).

The photonic sensor 400 of FIG. 4 can be implemented with an integrated sensing head or structured-light sensor (SLS) system and field housing. The photonic sensor 400 can use several structure light sensors and laser ranging sensors that are available in the market, for example, Ladimo, Blackrock, or Velodyne, in various combinations. In most cases, the number of devices used can vary with axial or longitudinal resolution requirements. In some implementations, one sensor can be located and used every 30 centimeters (cm) to 50 cm if axial resolution is to be better than 0.1 millimeters (mm). This ratio can depend on the features of the sensor that is used. The use an array of sensors, for example, can depend on the position of each SLS, as each beam 406 may be occluded from seeing some parts of the wellhead. An onboard edge-computing system can use all-optical or ASIC processing. The photonic sensor 400 can include a self-cleaning and anti-fogging window that helps to ensure prolonged maintenance-free, optical monitoring. Two non-mutually exclusive routes that can be used to achieve the following two examples.

A first example includes modifying the surface to exhibit at least one of the following atypical behaviors: hydrophobicity, hydrophilicity, oleophobicity, superhydrophobicity and super olephobicity. This allows for the surface to either completely repel liquids and particles (hydro/oleophobic or super hydro/oleophobic surfaces), or to spread the liquids evenly across the whole surface in order to avoid lensing or diffusive effects, while flushing out contaminants (for example, hydrophilic or super hydrophilic surfaces). Implementations using a diamond window can include a deposition of a tailored diamond nanofilm, or diamond-like carbon structures to exhibit long-lasting self-cleaning and anti-fogging effects, while retaining high optical transmittance.

A second example includes the use of TiO2-based photocatalytic surfaces. When ambient ultraviolet light interacts with TiO2, the surface releases active oxygen species. The oxygen radical combusts the organics attached to the surface, and thus cleaning the surface. Photocatalytic surfaces can exhibit anti-fogging and self-cleaning properties as well as antibacterial and antifouling properties.

Figure 5:
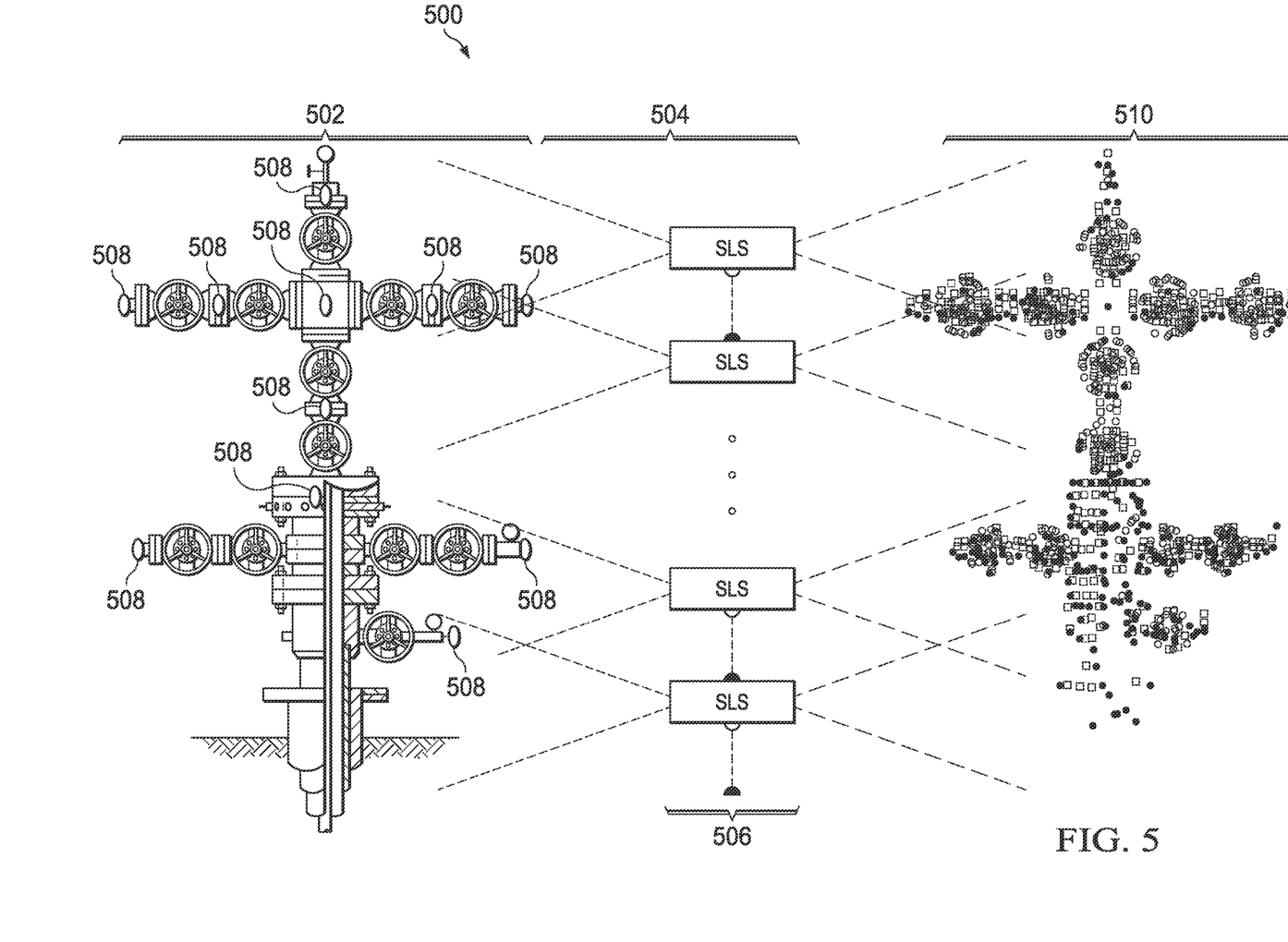
FIG. 5 is a diagram showing an example of a photonic sensing system used on a wellhead structure, according to some implementations of the present disclosure.

FIG. 5 is a diagram showing an example of a photonic sensing system 500 used on a wellhead structure 502, according to some implementations of the present disclosure. The photonic sensing system 500 includes an SLS array and projection 504. The SLS array can be mounted on a rack. Each SLS 506 can incorporate a laser meter to determine the distance between each SLS 506 and the ground. These features can makes the photonic sensing system 500 capable of measuring absolute displacement with reference to the ground. Reference/beacon markers 508 of the SLS array are shown in using white circles on the wellhead structure 502. The photonic sensing system 500 produces a point cloud 510 representing points on the wellhead structure 502.

Each of the SLSes can be mounted on a rack. Each SLS can use a laser ranging system at the bottom of the SLS to monitor the distance to the next measurement device (for example, below the SLS). This enables the process to know the relative position of each measurement device and hence improve the axial/longitudinal displacement characterization.

The horizontal (H) and vertical (V) resolution of structured light sensors can vary depending on the configuration of the photonic sensing system used. Thus, a resolution $\Delta_{h,v}$, can be represented as a function of a distance $r_{sls}$ from a circumscribing cylinder to an optical output and the angular resolution $\phi_{H/V}$, for example given by:

$$\Delta_{h,v} = r_{sls} \tan \phi_{h,v} \quad (3)$$

A field of view (FOV) of an SLS can typically span, for example, from 170-360 degrees in a horizontal direction and 5-30 degrees in a vertical direction. These spans and the distance to the target can determine the number of SLSes needed in the array configuration.

Figure 6A:
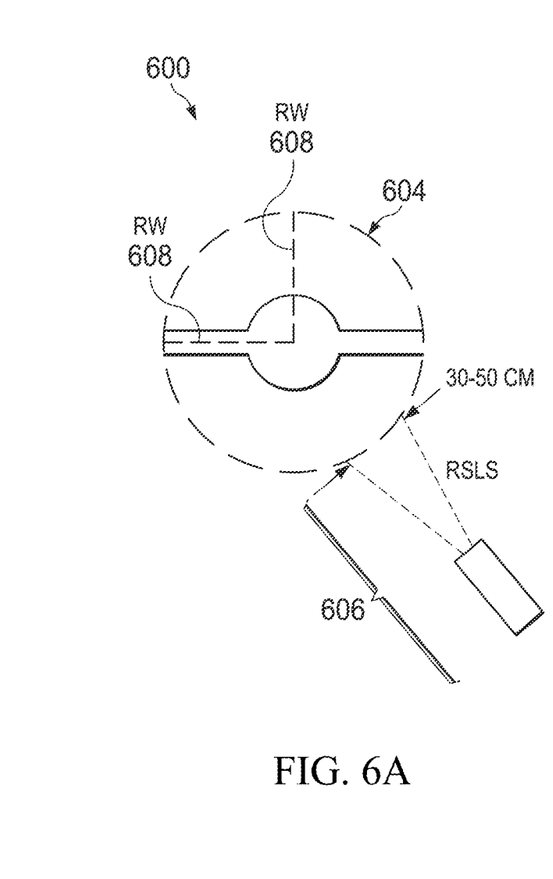
FIGS. 6A and 6B show example top views and of a photonic sensing system, according to some implementations of the present disclosure.
Figure 6B:
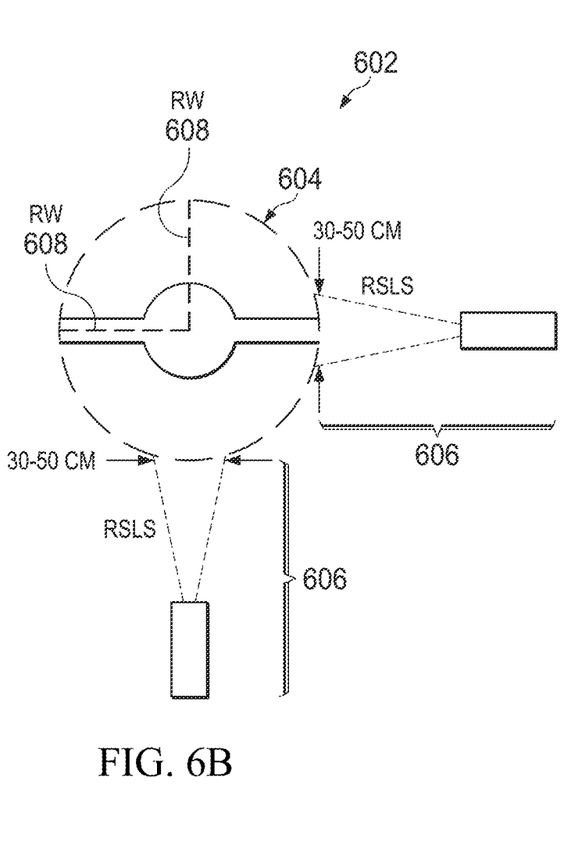

FIGS. 6A and 6B show example top views 600 and 602 of a photonic sensing system, according to some implementations of the present disclosure. The top views 600 and 602 show a wellhead structure 604 and an SLS array 606, with examples of recommended positions of remote structured light sensors (RSLSes) as seen from the top. The wellhead structure 604 has a maximum radius 608 of wellhead, including the arms of the wellhead. Long and short axes of the parabola can be chosen such that a pattern projected by each beam on the structure covers a pre-determined area, for example, a 30 centimeter (cm) to 50 cm wide plane that is tangent to the cylinder that circumscribes the wellhead structure 604. The suggested positions can be chosen to maximize view and characterization.

The photonic sensing system can be also used to characterize stresses along a structure (for example, of the wellhead structure 604). In this case, the photonic sensing system can be modified to perform photonic-stress analysis tomography. In this setting, the output beam of the analyzer can be elliptically polarized using variable or permanent wavelength retarders. The polarization can also be built into the laser system, which provides the beam. This polarization step is done prior to the creation of the pattern. The structure, completely or in part, is covered with a birefringent film (for example, epoxy or oil transparent to the wavelength used in the source). The reflected beam is then separated into its base polarization and the intensity patterns for each polarization are compared. The resulting polarization and spectra distribution can be used to derive the stress map according to the strain/stress-optical law.

Figure 7:
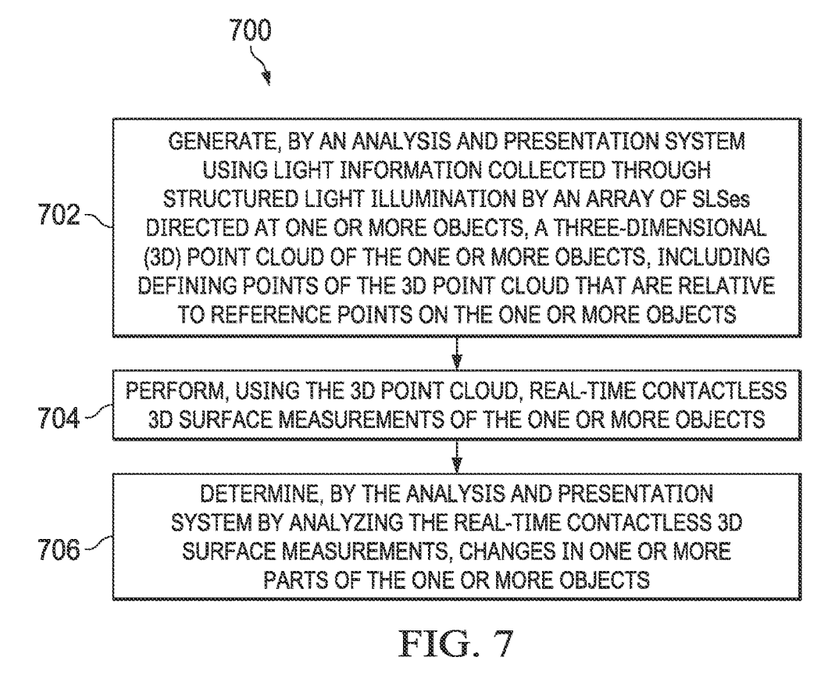
FIG. 7 is a flowchart of an example of a method for using a real-time contactless three-dimensional (3D) surface measurements to determine changes in one or more parts of the one or more objects, according to some implementations of the present disclosure.

FIG. 7 is a flowchart of an example of a method 700 for using a real-time contactless 3D surface measurements to determine changes in one or more parts of the one or more objects, according to some implementations of the present disclosure. For clarity of presentation, the description that follows generally describes method 700 in the context of the other figures in this description. However, it will be understood that method 700 can be performed, for example, by any suitable system, environment, software, and hardware, or a combination of systems, environments, software, and hardware, as appropriate. In some implementations, various steps of method 700 can be run in parallel, in combination, in loops, or in any order.

At 702, a 3D point cloud of the one or more objects is generating by an analysis and presentation system using light information collected through structured light illumination by an array of SLSes directed toward one or more objects. The SLSes can include laser-patterned illumination devices, for example. Generating the point cloud include defining points of the 3D point cloud that are relative to reference points on the one or more objects. The one or more objects can include equipment used in petrochemical industry operations. The equipment includes one or more of wellheads, production tubing, and manifolds. The reference points can be markers positioned on specific locations on the equipment. The SLSes can provide a spatial resolution, for example, of 100 micrometers and a repetition rate, for example, greater than or equal to 60 Hertz (Hz). The SLSes can determine, for each point in the point cloud, an x,y,z,λ value, where x,y,z are 3D spatial coordinates and λ is an illumination wavelength at the 3D spatial coordinates. In some implementations, the analysis and presentation system can include analytics tools for correlate and predict flow using data available through a supervisory control and data acquisition (SCADA) system. From 702, method 700 proceeds to 704.

At 704, real-time contactless 3D surface measurements of the one or more objects are performed using the 3D point cloud. From 704, method 700 proceeds to 706.

At 706, changes in one or more parts of the one or more objects are determined by an analysis and presentation system by analyzing the real-time contactless 3D surface measurements. As an example, determining the changes in the one or more parts of the one or more objects can includes deriving changes in structural properties including displacements, deformations, stress/strain states, and material accretion/contamination and degradation. After 706, method 700 can stop.

Figure 8:
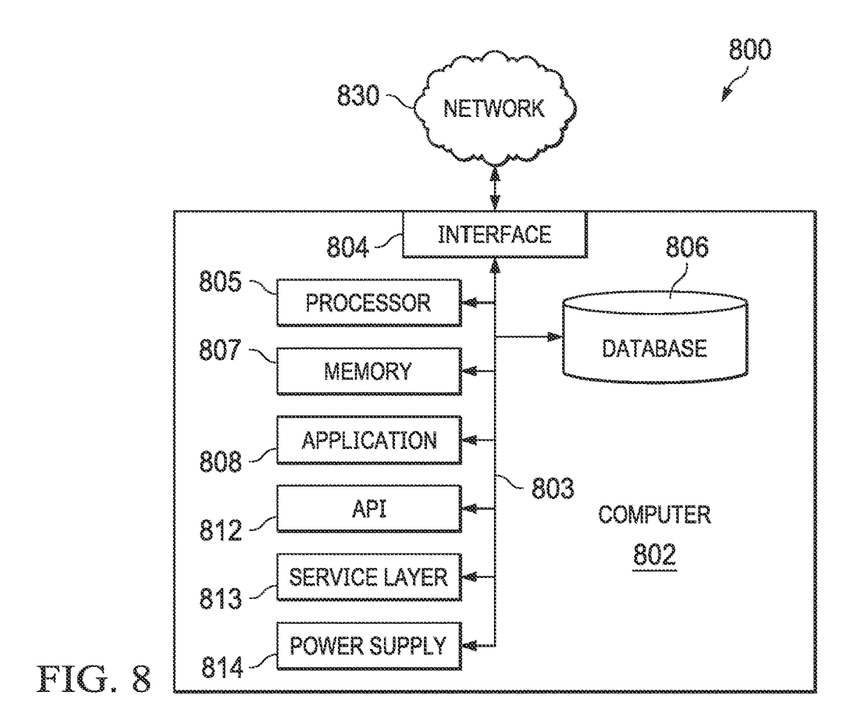
FIG. 8 is a block diagram illustrating an example computer system used to provide computational functionalities associated with described algorithms, methods, functions, processes, flows, and procedures as described in the present disclosure, according to some implementations of the present disclosure.

FIG. 8 is a block diagram of an example computer system 800 used to provide computational functionalities associated with described algorithms, methods, functions, processes, flows, and procedures described in the present disclosure, according to some implementations of the present disclosure. The illustrated computer 802 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 802 can include input devices such as keypads, keyboards, and touch screens that can accept user information. Also, the computer 802 can include output devices that can convey information associated with the operation of the computer 802. The information can include digital data, visual data, audio information, or a combination of information. The information can be presented in a graphical user interface (UI) (or GUI).

The computer 802 can serve in a role as a client, a network component, a server, a database, a persistency, or components of a computer system for performing the subject matter described in the present disclosure. The illustrated computer 802 is communicably coupled with a network 830. In some implementations, one or more components of the computer 802 can be configured to operate within different environments, including cloud-computing-based environments, local environments, global environments, and combinations of environments.

At a top level, the computer 802 is an electronic computing device operable to receive, transmit, process, store, and manage data and information associated with the described subject matter. According to some implementations, the computer 802 can also include, or be communicably coupled with, an application server, an email server, a web server, a caching server, a streaming data server, or a combination of servers.

The computer 802 can receive requests over network 830 from a client application (for example, executing on another computer 802). The computer 802 can respond to the received requests by processing the received requests using software applications. Requests can also be sent to the computer 802 from internal users (for example, from a command console), external (or third) parties, automated applications, entities, individuals, systems, and computers.

Each of the components of the computer 802 can communicate using a system bus 803. In some implementations, any or all of the components of the computer 802, including hardware or software components, can interface with each other or the interface 804 (or a combination of both) over the system bus 803. Interfaces can use an application programming interface (API) 812, a service layer 813, or a combination of the API 812 and service layer 813. The API 812 can include specifications for routines, data structures, and object classes. The API 812 can be either computer-language independent or dependent. The API 812 can refer to a complete interface, a single function, or a set of APIs.

The service layer 813 can provide software services to the computer 802 and other components (whether illustrated or not) that are communicably coupled to the computer 802. The functionality of the computer 802 can be accessible for all service consumers using this service layer. Software services, such as those provided by the service layer 813, can provide reusable, defined functionalities through a defined interface. For example, the interface can be software written in JAVA, C++, or a language providing data in extensible markup language (XML) format. While illustrated as an integrated component of the computer 802, in alternative implementations, the API 812 or the service layer 813 can be stand-alone components in relation to other components of the computer 802 and other components communicably coupled to the computer 802. Moreover, any or all parts of the API 812 or the service layer 813 can be implemented as child or sub-modules of another software module, enterprise application, or hardware module without departing from the scope of the present disclosure.

The computer 802 includes an interface 804. Although illustrated as a single interface 804 in FIG. 8, two or more interfaces 804 can be used according to particular needs, desires, or particular implementations of the computer 802 and the described functionality. The interface 804 can be used by the computer 802 for communicating with other systems that are connected to the network 830 (whether illustrated or not) in a distributed environment. Generally, the interface 804 can include, or be implemented using, logic encoded in software or hardware (or a combination of software and hardware) operable to communicate with the network 830. More specifically, the interface 804 can include software supporting one or more communication protocols associated with communications. As such, the network 830 or the interface's hardware can be operable to communicate physical signals within and outside of the illustrated computer 802.

The computer 802 includes a processor 805. Although illustrated as a single processor 805 in FIG. 8, two or more processors 805 can be used according to particular needs, desires, or particular implementations of the computer 802 and the described functionality. Generally, the processor 805 can execute instructions and can manipulate data to perform the operations of the computer 802, including operations using algorithms, methods, functions, processes, flows, and procedures as described in the present disclosure.

The computer 802 also includes a database 806 that can hold data for the computer 802 and other components connected to the network 830 (whether illustrated or not). For example, database 806 can be an in-memory, conventional, or a database storing data consistent with the present disclosure. In some implementations, database 806 can be a combination of two or more different database types (for example, hybrid in-memory and conventional databases) according to particular needs, desires, or particular implementations of the computer 802 and the described functionality. Although illustrated as a single database 806 in FIG. 8, two or more databases (of the same, different, or combination of types) can be used according to particular needs, desires, or particular implementations of the computer 802 and the described functionality. While database 806 is illustrated as an internal component of the computer 802, in alternative implementations, database 806 can be external to the computer 802.

The computer 802 also includes a memory 807 that can hold data for the computer 802 or a combination of components connected to the network 830 (whether illustrated or not). Memory 807 can store any data consistent with the present disclosure. In some implementations, memory 807 can be a combination of two or more different types of memory (for example, a combination of semiconductor and magnetic storage) according to particular needs, desires, or particular implementations of the computer 802 and the described functionality. Although illustrated as a single memory 807 in FIG. 8, two or more memories 807 (of the same, different, or combination of types) can be used according to particular needs, desires, or particular implementations of the computer 802 and the described functionality. While memory 807 is illustrated as an internal component of the computer 802, in alternative implementations, memory 807 can be external to the computer 802.

The application 808 can be an algorithmic software engine providing functionality according to particular needs, desires, or particular implementations of the computer 802 and the described functionality. For example, application 808 can serve as one or more components, modules, or applications. Further, although illustrated as a single application 808, the application 808 can be implemented as multiple applications 808 on the computer 802. In addition, although illustrated as internal to the computer 802, in alternative implementations, the application 808 can be external to the computer 802.

The computer 802 can also include a power supply 814. The power supply 814 can include a rechargeable or non-rechargeable battery that can be configured to be either user- or non-user-replaceable. In some implementations, the power supply 814 can include power-conversion and management circuits, including recharging, standby, and power management functionalities. In some implementations, the power-supply 814 can include a power plug to allow the computer 802 to be plugged into a wall socket or a power source to, for example, power the computer 802 or recharge a rechargeable battery.

There can be any number of computers 802 associated with, or external to, a computer system containing computer 802, with each computer 802 communicating over network 830. Further, the terms "client," "user," and other appropriate terminology can be used interchangeably, as appropriate, without departing from the scope of the present disclosure.

Moreover, the present disclosure contemplates that many users can use one computer 802 and one user can use multiple computers 802.

Described implementations of the subject matter can include one or more features, alone or in combination.

For example, in a first implementation, a computer-implemented method includes the following. A three-dimensional (3D) point cloud of one or more objects is generated by an analysis and presentation system using light information collected through structured light illumination by an array of structured-light sensors (SLSes) directed toward the one or more objects. Generating the point cloud includes defining points of the 3D point cloud that are relative to reference points on the one or more objects. Real-time contactless 3D surface measurements of the one or more objects are performed using the 3D point cloud. Changes in one or more parts of the one or more objects are determined by the an analysis and presentation system by analyzing the real-time contactless 3D surface measurements.

The foregoing and other described implementations can each, optionally, include one or more of the following features:

A first feature, combinable with any of the following features, where the one or more objects include equipment used in petrochemical industry operations, where the equipment includes one or more of wellheads, production tubing, and manifolds, and where the reference points are markers positioned on specific locations on the equipment.

A second feature, combinable with any of the previous or following features, where the SLSes include laser-patterned illumination devices.

A third feature, combinable with any of the previous or following features, where determining the changes in the one or more parts of the one or more objects includes deriving changes in structural properties including displacements, deformations, stress/strain states, and material accretion/contamination and degradation.

A fourth feature, combinable with any of the previous or following features, where the SLSes provide a spatial resolution of 100 micrometers and a repetition rate greater than or equal to 60 Hertz (Hz).

A fifth feature, combinable with any of the previous or following features, where the SLSes determine, for each point in the point cloud, an x,y,z,λ value, and where x,y,z are 3D spatial coordinates and λ is an illumination wavelength at the 3D spatial coordinates.

A sixth feature, combinable with any of the previous or following features, where the analysis and presentation system includes analytics tools for correlate and predict flow using data available through a supervisory control and data acquisition (SCADA) system.

In a second implementation, a non-transitory, computer-readable medium stores one or more instructions executable by a computer system to perform operations including the following. A three-dimensional (3D) point cloud of one or more objects is generated by an analysis and presentation system using light information collected through structured light illumination by an array of structured-light sensors (SLSes) directed toward the one or more objects. Generating the point cloud includes defining points of the 3D point cloud that are relative to reference points on the one or more objects. Real-time contactless 3D surface measurements of the one or more objects are performed using the 3D point cloud. Changes in one or more parts of the one or more objects are determined by the an analysis and presentation system by analyzing the real-time contactless 3D surface measurements.

The foregoing and other described implementations can each, optionally, include one or more of the following features:

A first feature, combinable with any of the following features, where the one or more objects include equipment used in petrochemical industry operations, where the equipment includes one or more of wellheads, production tubing, and manifolds, and where the reference points are markers positioned on specific locations on the equipment.

A second feature, combinable with any of the previous or following features, where the SLSes include laser-patterned illumination devices.

A third feature, combinable with any of the previous or following features, where determining the changes in the one or more parts of the one or more objects includes deriving changes in structural properties including displacements, deformations, stress/strain states, and material accretion/contamination and degradation.

A fourth feature, combinable with any of the previous or following features, where the SLSes provide a spatial resolution of 100 micrometers and a repetition rate greater than or equal to 60 Hertz (Hz).

A fifth feature, combinable with any of the previous or following features, where the SLSes determine, for each point in the point cloud, an x,y,z,λ value, and where x,y,z are 3D spatial coordinates and λ is an illumination wavelength at the 3D spatial coordinates.

A sixth feature, combinable with any of the previous or following features, where the analysis and presentation system includes analytics tools for correlate and predict flow using data available through a supervisory control and data acquisition (SCADA) system.

In a third implementation, a computer-implemented system includes: an array of structured-light sensors (SLSes) directed toward one or more objects; a computerized data collection system configured to collect light information from the array of SLSes; an analysis and presentation system configured to provide analysis and visualization of the light information collected from the array of SLSes; and a data transmission system for transmitting information between the array of SLSes, the computerized data collection system, and the analysis and presentation system. The computer-implemented system includes one or more processors and a non-transitory computer-readable storage medium coupled to the one or more processors and storing programming instructions for execution by the one or more processors. The programming instructions instruct the one or more processors to perform operations including the following. A three-dimensional (3D) point cloud of one or more objects is generated by an analysis and presentation system using light information collected through structured light illumination by an array of structured-light sensors (SLSes) directed toward the one or more objects. Generating the point cloud includes defining points of the 3D point cloud that are relative to reference points on the one or more objects. Real-time contactless 3D surface measurements of the one or more objects are performed using the 3D point cloud. Changes in one or more parts of the one or more objects are determined by the an analysis and presentation system by analyzing the real-time contactless 3D surface measurements.

The foregoing and other described implementations can each, optionally, include one or more of the following features:

A first feature, combinable with any of the following features, where the one or more objects include equipment used in petrochemical industry operations, where the equipment includes one or more of wellheads, production tubing, and manifolds, and where the reference points are markers positioned on specific locations on the equipment.

A second feature, combinable with any of the previous or following features, where the SLSes include laser-patterned illumination devices.

A third feature, combinable with any of the previous or following features, where determining the changes in the one or more parts of the one or more objects includes deriving changes in structural properties including displacements, deformations, stress/strain states, and material accretion/contamination and degradation.

A fourth feature, combinable with any of the previous or following features, where the SLSes provide a spatial resolution of 100 micrometers and a repetition rate greater than or equal to 60 Hertz (Hz).

A fifth feature, combinable with any of the previous or following features, where the SLSes determine, for each point in the point cloud, an x,y,z,λ value, and where x,y,z are 3D spatial coordinates and λ is an illumination wavelength at the 3D spatial coordinates.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A system, comprising:
    an array of structured-light sensors (SLSes) directed toward one or more objects;
    a computerized data collection system configured to collect light information from the array of SLSes;
    an analysis and presentation system configured to provide analysis and visualization of the light information collected from the array of SLSes;
    a data transmission system for transmitting information between the array of SLSes, the computerized data collection system, and the analysis and presentation system;
    one or more processors; and
    a non-transitory computer-readable storage medium coupled to the one or more processors and storing programming instructions for execution by the one or more processors, the programming instructions instructing the one or more processors to perform operations comprising:
        generating, by the analysis and presentation system using light information collected through structured light illumination by the array of SLSes, a three-dimensional (3D) point cloud of the one or more objects, including defining points of the 3D point cloud that are relative to reference points on the one or more objects;
        performing, using the 3D point cloud, real-time contactless 3D surface measurements of the one or more objects; and
        determining, by the analysis and presentation system by analyzing the real-time contactless 3D surface measurements, material changes, damage, deformations, mechanical tension and strain, material degradation and contamination, and correlations between displacement, temperature, and flow rates in one or more parts of the one or more objects.

2. The system of claim 1, wherein the one or more objects include equipment used in petrochemical industry operations, wherein the equipment includes one or more of wellheads, production tubing, and manifolds, and wherein the reference points are markers positioned on specific locations on the equipment.

3. The system of claim 1, wherein the SLSes include laser-patterned illumination devices.

4. The system of claim 1, wherein the SLSes provide a spatial resolution of 100 micrometers and a repetition rate greater than or equal to 60 Hertz (Hz).

5. The system of claim 1, wherein the SLSes determine, for each point in the point cloud, an x,y,z,λ value, and wherein x,y,z are 3D spatial coordinates and λ is an illumination wavelength at the 3D spatial coordinates.

6. The system of claim 1, wherein the analysis and presentation system includes analytics tools for correlate and predict flow using data available through a supervisory control and data acquisition (SCADA) system.

7. A computer-implemented method, comprising:
generating, by an analysis and presentation system using light information collected through structured light illumination by an array of structured-light sensors (SLSes) directed toward one or more objects, a three-dimensional (3D) point cloud of the one or more objects, including defining points of the 3D point cloud that are relative to reference points on the one or more objects;
performing, using the 3D point cloud, real-time contactless 3D surface measurements of the one or more objects; and
determining, by an analysis and presentation system by analyzing the real-time contactless 3D surface measurements, material changes, damage, deformations, mechanical tension and strain, material degradation and contamination, and correlations between displacement, temperature, and flow rates in one or more parts of the one or more objects.

8. The computer-implemented method of claim 7, wherein the one or more objects include equipment used in petrochemical industry operations, wherein the equipment includes one or more of wellheads, production tubing, and manifolds, and wherein the reference points are markers positioned on specific locations on the equipment.

9. The computer-implemented method of claim 7, wherein the SLSes include laser-patterned illumination devices.

10. The computer-implemented method of claim 7, wherein the SLSes provide a spatial resolution of 100 micrometers and a repetition rate greater than or equal to 60 Hertz (Hz).

11. The computer-implemented method of claim 7, wherein the SLSes determine, for each point in the point cloud, an x,y,z,λ value, and wherein x,y,z are 3D spatial coordinates and λ is an illumination wavelength at the 3D spatial coordinates.

12. The computer-implemented method of claim 7, wherein the analysis and presentation system includes analytics tools for correlate and predict flow using data available through a supervisory control and data acquisition (SCADA) system.

13. A non-transitory, computer-readable medium storing one or more instructions executable by a computer system to perform operations comprising:
generating, by an analysis and presentation system using light information collected through structured light illumination by an array of structured-light sensors (SLSes) directed toward one or more objects, a three-dimensional (3D) point cloud of the one or more objects, including defining points of the 3D point cloud that are relative to reference points on the one or more objects;
performing, using the 3D point cloud, real-time contactless 3D surface measurements of the one or more objects; and
determining, by an analysis and presentation system by analyzing the real-time contactless 3D surface measurements, material changes, damage, deformations, mechanical tension and strain, material degradation and contamination, and correlations between displacement, temperature, and flow rates in one or more parts of the one or more objects.

14. The non-transitory, computer-readable medium of claim 13, wherein the one or more objects include equipment used in petrochemical industry operations, wherein the equipment includes one or more of wellheads, production tubing, and manifolds, and wherein the reference points are markers positioned on specific locations on the equipment.

15. The non-transitory, computer-readable medium of claim 13, wherein the SLSes include laser-patterned illumination devices.

16. The non-transitory, computer-readable medium of claim 13, wherein the SLSes provide a spatial resolution of 100 micrometers and a repetition rate greater than or equal to 60 Hertz (Hz).

17. The non-transitory, computer-readable medium of claim 13, wherein the SLSes determine, for each point in the point cloud, an x,y,z,λ value, and wherein x,y,z are 3D spatial coordinates and λ is an illumination wavelength at the 3D spatial coordinates.

* * * * *

UNITED STATES PATENT AND TRADEMARK OFFICE
CERTIFICATE OF CORRECTION

| | |
|---|---|
| PATENT NO. | : 11,725,504 B2 |
| APPLICATION NO. | : 17/328159 |
| DATED | : August 15, 2023 |
| INVENTOR(S) | : Damian Pablo Alerigi et al. |

It is certified that error appears in the above-identified patent and that said Letters Patent is hereby corrected as shown below:

On the Title Page

Column 2, Line 15, Item (57) ABSTRACT, please replace "the an analysis" with -- the analysis --.

Signed and Sealed this
Twenty-eighth Day of November, 2023

Katherine Kelly Vidal
*Director of the United States Patent and Trademark Office*